US012070069B2

(12) United States Patent
Voerman

(10) Patent No.: US 12,070,069 B2
(45) **Date of Patent: *Aug. 27, 2024**

(54) E-CIGARETTE

(71) Applicant: JT International SA, Geneva (CH)

(72) Inventor: Dick Paul Voerman, Apeldoorn (NL)

(73) Assignee: JT International S.A. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,430

(22) Filed: Oct. 6, 2023

(65) Prior Publication Data

US 2024/0108067 A1 Apr. 4, 2024

Related U.S. Application Data

(63) Continuation of application No. 18/085,115, filed on Dec. 20, 2022, now Pat. No. 11,819,061, which is a continuation of application No. 17/859,636, filed on Jul. 7, 2022, now Pat. No. 11,533,951, which is a continuation of application No. 16/091,398, filed as application No. PCT/NL2017/050205 on Apr. 3, 2017, now Pat. No. 11,382,357.

(30) Foreign Application Priority Data

Apr. 4, 2016 (NL) .................................... 2016548

(51) Int. Cl.

| | |
|---|---|
| ***A24F 40/46*** | (2020.01) |
| ***A24F 40/44*** | (2020.01) |
| ***H05B 3/54*** | (2006.01) |
| *A24F 40/10* | (2020.01) |

(52) U.S. Cl.

CPC .............. *A24F 40/46* (2020.01); *A24F 40/44* (2020.01); *H05B 3/54* (2013.01); *A24F 40/10* (2020.01); *H05B 2203/021* (2013.01)

(58) Field of Classification Search

None

See application file for complete search history.

(56) References Cited

U.S. PATENT DOCUMENTS 9,456,634 B2 10/2016 Wang et al.
9,961,940 B2 5/2018 Anderson, Jr. et al.
(Continued)

FOREIGN PATENT DOCUMENTS

CN 104812261 A 7/2015
CN 204653778 U 9/2015
(Continued)

OTHER PUBLICATIONS

International Search Report and Written Opinion dated Jun. 6, 2017 for Application No. PCT/NL2017/050205.
(Continued)

*Primary Examiner* — Tho D Ta

(74) *Attorney, Agent, or Firm* — Lerner David LLP

(57) ABSTRACT

An e-cigarette includes a housing having a liquid section for holding a liquid and a battery section for holding a battery, which liquid section and battery section are configured to be coupled to each other, and a wick to take up the liquid, a heating member for heating the wick, wherein the liquid section includes a liquid reservoir provided with a liquid outlet to supply liquid to the wick and an air duct to create an air flow along the wick and to an air outlet.

19 Claims, 22 Drawing Sheets

(56) References Cited

U.S. PATENT DOCUMENTS

| | | | |
|---|---|---|---|
| 11,382,357 | B2 | 7/2022 | Voerman |
| 11,819,061 | B2 * | 11/2023 | Voerman ................ A24F 40/44 |
| 2011/0094523 | A1 | 4/2011 | Thorens et al. |
| 2013/0192615 | A1 | 8/2013 | Tucker et al. |
| 2014/0238422 | A1 | 8/2014 | Plunkett et al. |
| 2014/0246020 | A1 | 9/2014 | Minskoff et al. |
| 2016/0021930 | A1 | 1/2016 | Minskoff et al. |
| 2017/0006917 | A1 | 1/2017 | Alvarez |
| 2020/0352241 | A1 | 11/2020 | Capuano et al. |

FOREIGN PATENT DOCUMENTS

| | | | |
|---|---|---|---|
| EP | 2959784 | A1 | 12/2015 |
| WO | 2014150979 | A2 | 9/2014 |
| WO | 2015011565 | A2 | 1/2015 |
| WO | 2015117703 | A1 | 8/2015 |
| WO | 2015122773 | A1 | 8/2015 |
| WO | 2016131755 | A1 | 8/2016 |

OTHER PUBLICATIONS

Search Report dated Sep. 22, 2016 for Application No. 2016548.
Search Report for Chinese Application No. 2017800328304 issued Oct. 15, 2020; 3 pages.
Zhu, Donglai et al., "E-Cigarette," Aug. 31, 2015, p. 580.
Supplemental Search Report for European Application No. 201780032830.4 dated Dec. 3, 2021. 2 pgs.

* cited by examiner

E-CIGARETTE

CROSS-REFERENCE TO RELATED APPLICATIONS

The present application is a continuation of U.S. patent application Ser. No. 18/085,115, filed on Dec. 20, 2022, which is a continuation of U.S. patent application Ser. No. 17/859,636, filed on Jul. 7, 2022, which is a continuation of U.S. patent application Ser. No. 16/091,398, filed on Oct. 4, 2018, which is a national phase entry under 35 U.S.C. § 371 of International Application No. PCT/NL2017/050205, filed Apr. 3, 2017, published in English, which claims priority to Netherlands Patent Application No. 2016548 filed Apr. 4, 2016, the disclosures of which are incorporated herein by reference.

FIELD OF THE INVENTION

The invention relates to an electronic cigarette for providing a vapour. The vapour can be inhaled by a person.

BACKGROUND OF THE INVENTION

The known electronic cigarette comprises a housing having a liquid section and a battery section, and a wick and heating member located in the housing. The electrical wires are attached to the heating member to provide electrical power from the battery. A disadvantage of the known electronic cigarette is that it is difficult to produce, especially to produce it mechanically.

SUMMARY OF THE INVENTION

The invention has the objective to provide an improved, or at least alternative, e-cigarette. According to one aspect according to the invention, the object is to provide an e-cigarette which can be produced in a more efficient manner. According to a further aspect according to the invention, the object is to provide an e-cigarette which is can be produced mechanically.

The e-cigarette according the invention comprises a housing having a liquid section for holding a liquid and a battery section for holding a battery, which liquid section and battery section are configured to be coupled to each other, a wick to take up the liquid, and a heating member for heating the wick, wherein the liquid section comprises a liquid reservoir provided with a liquid outlet to supply liquid to the wick and an air duct to create an air flow along the wick and to an air outlet, the heating member and the wick are combined to form a combined construction having an outer surface which is at least partly electrically conductive, and the e-cigarette comprises a first electrical contact member being electrically connected to an anode of the battery and a second electrical contact member being electrically connected to a cathode of the battery, which first and second electrical contact members are in contact with conductive parts of the outer surface of the combined construction without being attached to them.

Since the wick and the heating member form a combined construction, they can be supplied during the production process in a single processing step. In the known e-cigarette, the wick and the heating member are each supplied in a separate processing step. This allows that the e-cigarette according to the invention can be produced in a more efficient manner. It especially allows that the production process can be performed mechanically.

The e-cigarette further allows that the battery is electrically connected to the combined construction of the wick and heating member without being attached to it (via for example welded electrical wires). The process of electrically attaching elements is difficult to perform, especially to perform it mechanically. The fact that in the e-cigarette according to the invention the combined construction is electrically connected to the first and second electrical contact members without being attached to them, allows that the e-cigarette can be produced in a more simple manner. Due to this, the e-cigarette can be produced in a cost efficient manner by machines instead of by the hands of a person.

In an embodiment of the e-cigarette, the combined construction is free from protruding parts extending away from the outer surface.

In an embodiment of the e-cigarette, the entire combined construction extends along a straight line or a substantially straight line. The fact that the entire combined construction extends along a straight line increases the handling possibilities of the combined construction and allows that the e-cigarette is produced mechanically.

In an embodiment of the e-cigarette, the combined construction is free from protruding parts extending transverse to the straight line.

In an embodiment of the e-cigarette, the combined construction has an elongate form extending along its longitudinal axis.

In an embodiment of the e-cigarette, the combined construction has such a rigidity that it maintains its form when subjected to gravity.

In an embodiment of the e-cigarette, the combined construction has such a rigidity that it maintains its form when handled mechanically, such as during mechanical pick and place operations.

In an embodiment of the e-cigarette, the combined construction has a cross section perpendicular to the longitudinal axis, which cross section is constant along the longitudinal axis. The cross section can have the form of a circle, a square, a rectangle, or a polygon.

In an embodiment of the e-cigarette, the first and second electrical contact members are located at a distance from each other along the longitudinal axis of the combined construction.

In an embodiment of the e-cigarette, the combined construction is located between a first support member and an opposite second support member to hold the combined construction in a fixed position.

In an embodiment of the e-cigarette, the first and second electrical contact members are provided on the first support member. The second support member may comprise a first electrically conductive member located opposite to the first electrical contact member and a second electrically conductive member located opposite to the second electrical contact member.

In an embodiment of the e-cigarette, the first and second electrical contact members are provided on the second support member. The first support member may comprise a first electrically conductive member located opposite to the first electrical contact member and a second electrically conductive member located opposite to the second electrical contact member.

In an embodiment of the e-cigarette, the combined construction is in contact with the first and second support member without being attached to them.

In an embodiment of the e-cigarette, the combined construction is free from any attached contact with the e-cigarette. The combined construction may only have contact with the liquid section without being attached to it, or the battery section without being attached to it, or the liquid section and the battery section without being attached to them.

In an embodiment of the e-cigarette, the wick of the combined construction is formed by a ceramic material. The ceramic material may have a porous structure.

In an embodiment of the e-cigarette, the wick of the combined construction is formed by a fibrous material. The fibrous material may be a fibre rope.

In an embodiment of the e-cigarette, the heating member of the combined construction is formed by an electrically conductive wire.

In an embodiment of the e-cigarette, the electrically conductive wire extends along the entire length of the wick.

In an embodiment of the e-cigarette, the electrically conductive wire is wound in a helical form around the wick.

In an embodiment of the e-cigarette, the heating member is formed by an electrically conductive additive provided in the ceramic material.

In an embodiment of the e-cigarette, the combined construction is located in the liquid section.

In an embodiment of the e-cigarette, the liquid section comprises a first liquid part and a second liquid part, the first liquid part is provided with the liquid reservoir and the air outlet, the liquid outlet is located adjacent to the combined construction, the air duct extends from the combined construction to the air outlet, the first liquid part comprises a first coupling member and the second liquid part comprises a second coupling member which is configured to cooperate with the first coupling member to couple the second liquid part to the first liquid part such that the second liquid part is located in a coupled position, the first and second contact members are provided on the second liquid part.

In an embodiment of the e-cigarette, the second liquid part comprises a third electrical contact member being electrically connected to the first electrical contact member and a fourth electrical contact member being electrically connected to the second electrical contact member, which third and fourth electrical contact member are configured to become electrically connected with the battery when the battery section is coupled to the liquid section.

In an embodiment of the e-cigarette, the first liquid part is provided with the first support member and the second liquid part is provided with the second support member.

In an embodiment of the e-cigarette, the liquid reservoir is provided with a further liquid outlet located adjacent to the combined construction, the combined construction comprises a first construction end, a second construction end and an intermediate construction part which is located between the first construction end and the second construction end, and the first construction end is located at the liquid outlet, the second construction end is located at the further liquid outlet and the air duct is located at the intermediate construction part.

In an embodiment of the e-cigarette, the battery section comprises a fifth electrical contact member and a sixth electrical contact member which are in contact with the anode and the cathode of the battery, respectively, and the liquid section and the battery section are configured to place the third electrical contact member and the fourth electrical contact member in contact with the fifth electrical contact member and the sixth electrical contact member, respectively, when the liquid section is coupled to the battery section.

In an embodiment of the e-cigarette, the first liquid part is formed as a first single piece.

In an embodiment of the e-cigarette, the first liquid part is formed by injection moulding.

In an embodiment of the e-cigarette, the second liquid part is formed as a second single piece.

In an embodiment of the e-cigarette, the second liquid part is formed by injection moulding on electrically conductive material or by injection moulding in a first production step and electrically conductive material is deposed in a second production step.

In an embodiment of the e-cigarette, the combined construction is located in the battery section.

In an embodiment of the e-cigarette, the battery section comprises a first battery part and a second battery part, the first battery part is provided with the battery, the first battery part comprises a first coupling member and the second battery part comprises a second coupling member which is configured to cooperate with the first coupling member to couple the second battery part to the first battery part such that the second battery part is located in a coupled position, the first and second contact members are provided on the first battery part.

In an embodiment of the e-cigarette, the first battery part is provided with the first support member and the second battery part is provided with the second support member.

The invention further relates to a method of producing an e-cigarette, which method comprises the steps of providing the combined construction and positioning it on the liquid section or the battery section, and placing first and second contact members in contact with the outer surface of the combined construction without attaching the first and second contact members to the combined construction.

In an embodiment, the method comprises the step of placing the combined construction on the first support member, and placing the second support member in contact with the combined construction such that the combined construction is held in a fixed position.

In an embodiment, the method comprises the step of placing the combined construction in the first liquid part such that the combined construction extends along the liquid outlet and the air duct, and subsequently coupling the second liquid part to the first liquid part such that the second liquid part is located in the coupled position while the first and second electrical contact members contact electrically conductive parts at the outer surface of the combined construction.

In an embodiment, the method comprises the step of placing the combined construction in the first battery part, and subsequently coupling the second battery part to the first battery part such that the second battery part is located in the coupled position while the first and second electrical contact members contact electrically conductive parts at the outer surface of the combined construction.

In an embodiment of the method, the placing of the combined construction and the placing of the first and second contact members in contact with the combined construction is performed mechanically.

In an embodiment, the method comprises coupling the liquid section and the battery section to each other.

In an embodiment, the method comprises the steps of coupling the liquid section to the battery section such that the third electrical contact member and the fourth electrical contact member of the liquid section are in contact with the fifth electrical contact member and the sixth electrical contact member of the battery section.

BRIEF DESCRIPTION OF THE DRAWINGS

Embodiments of the e-cigarette and the method to produce the e-cigarette will be described by way of example only, with reference to the accompanying schematic drawings in which corresponding reference symbols indicate corresponding parts, and in which.

DETAILED DESCRIPTION OF THE DRAWINGS

Figure 1:
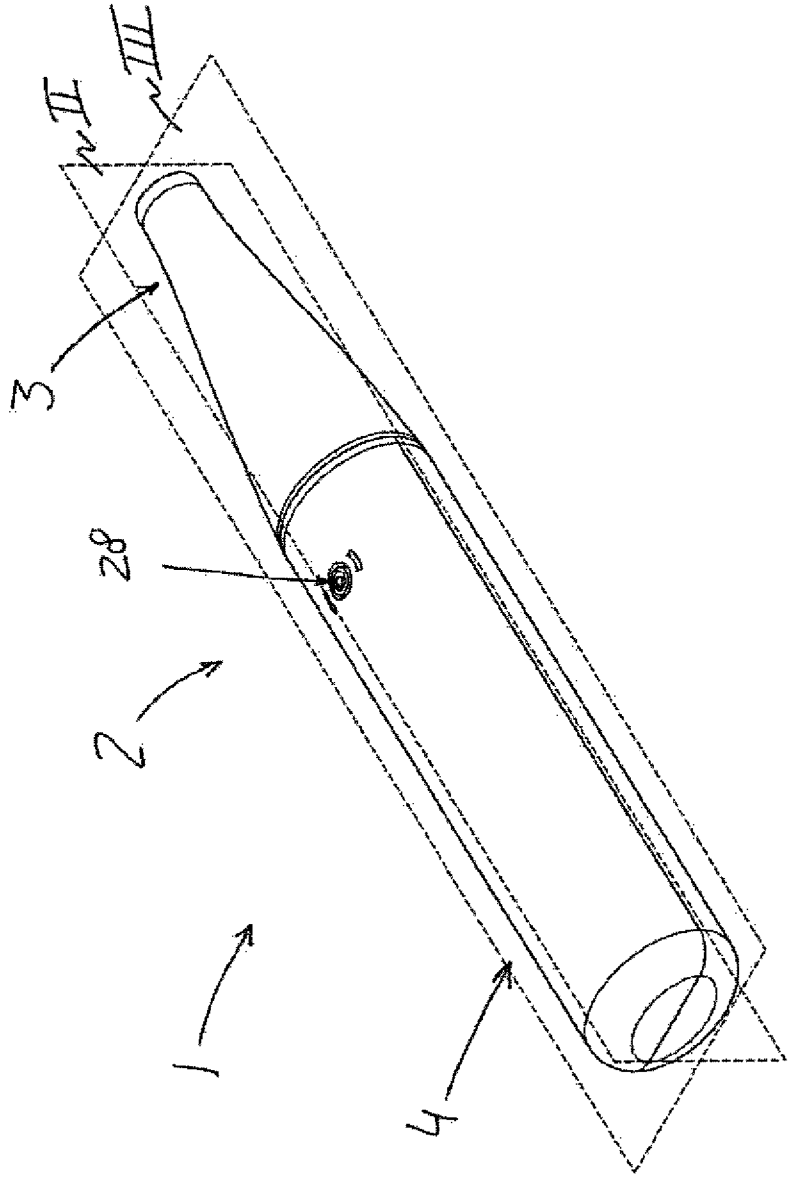
FIG. 1 schematically shows a view in perspective of a first embodiment of the e-cigarette according to the invention, FIG. 2 schematically shows a view in cross section along plane II of the e-cigarette of FIG. 1, FIG. 3 schematically shows a view in cross section along plane III of the e-cigarette of FIG. 1, the FIGS. 4A and 4B schematically show a view in perspective of the e-cigarette of FIG. 1, FIG. 5 schematically shows an enlarged view in perspective of the liquid section of the e-cigarette of FIG. 1, FIG. 6 schematically shows a view in cross section along plane VI of the liquid section of FIG. 5, FIG. 7 schematically shows a view in cross section along plane VII of the liquid section of FIG. 5, FIG. 8 schematically shows an exploded view of the liquid section of FIG. 5, FIG. 9 schematically shows a view in perspective of the first liquid part of the liquid section of FIG. 5, FIG. 10 schematically shows a view in perspective of the second liquid part of the liquid section of FIG. 5, FIG. 11 schematically shows a top view of a first embodiment of the combined construction of the liquid section of FIG. 5, FIG. 12 schematically shows a top view of a second embodiment of the combined construction of the liquid section of FIG. 5, the FIG. 13-16 schematically shows a first embodiment of the method of producing the e-cigarette, FIG. 17 schematically shows a view in cross section of a second embodiment of the e-cigarette according to the invention, wherein the cross sectional view is similar to the one shown in FIG. 2, FIG. 18 schematically shows a view in cross section of the second embodiment of the e-cigarette, wherein the cross sectional view is similar to the one shown in FIG. 3, the FIGS. 19 and 20 schematically show a view in perspective of the second embodiment wherein the liquid section is separated from the battery section, and FIG. 21 schematically shows an exploded view of the second embodiment.
Figure 2:
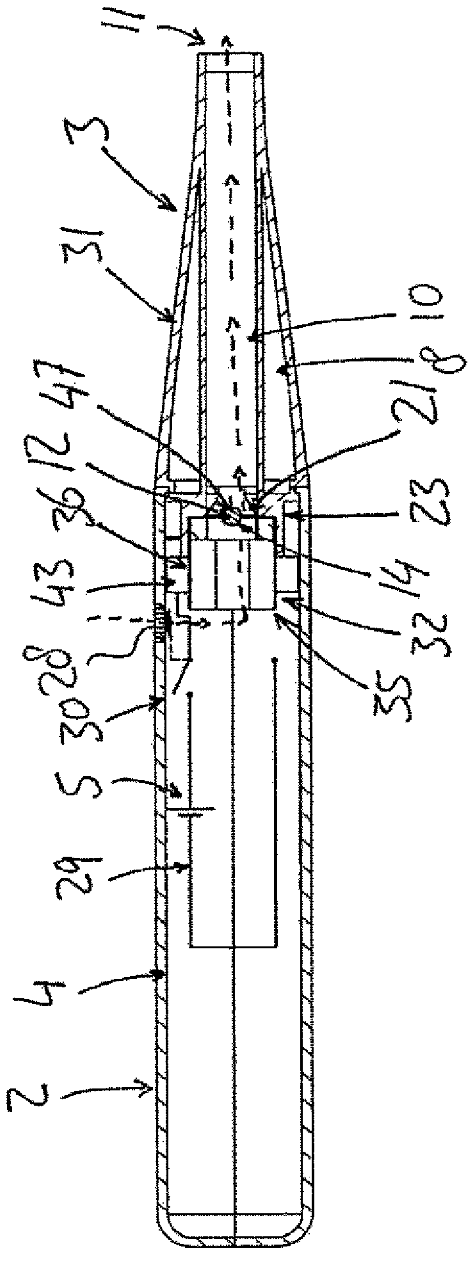
Figure 3:
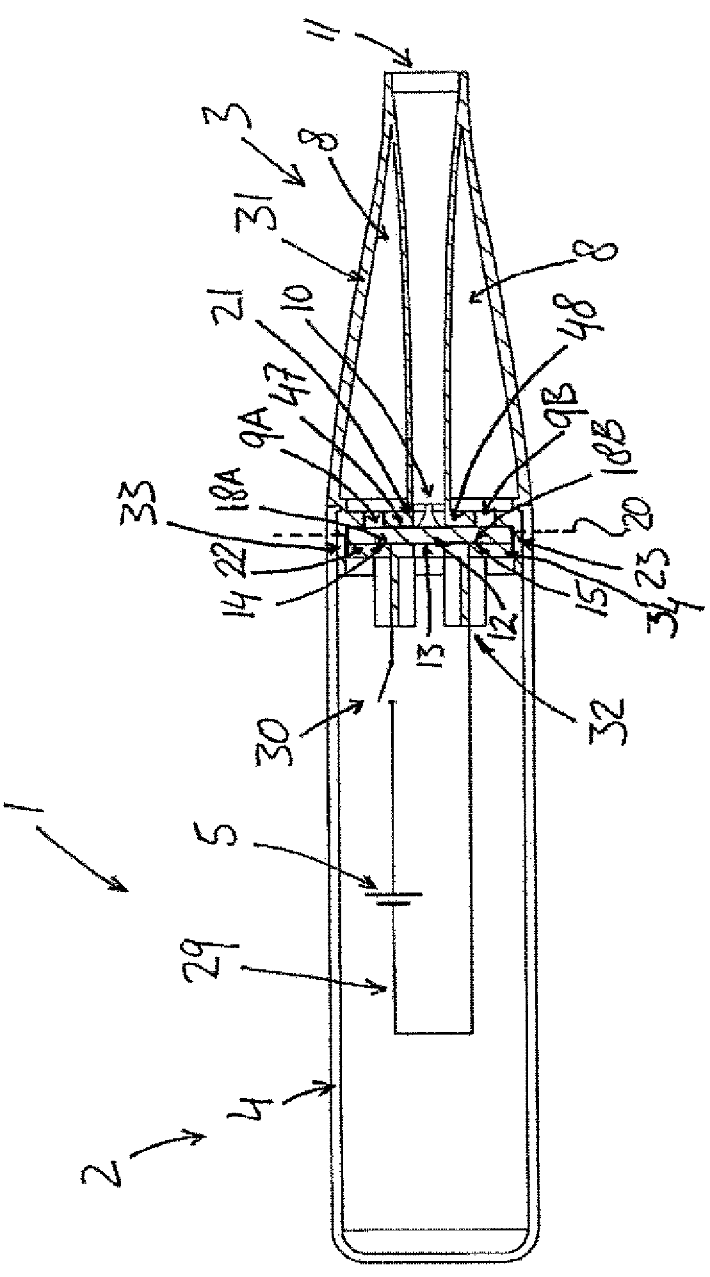
Figure 4A:
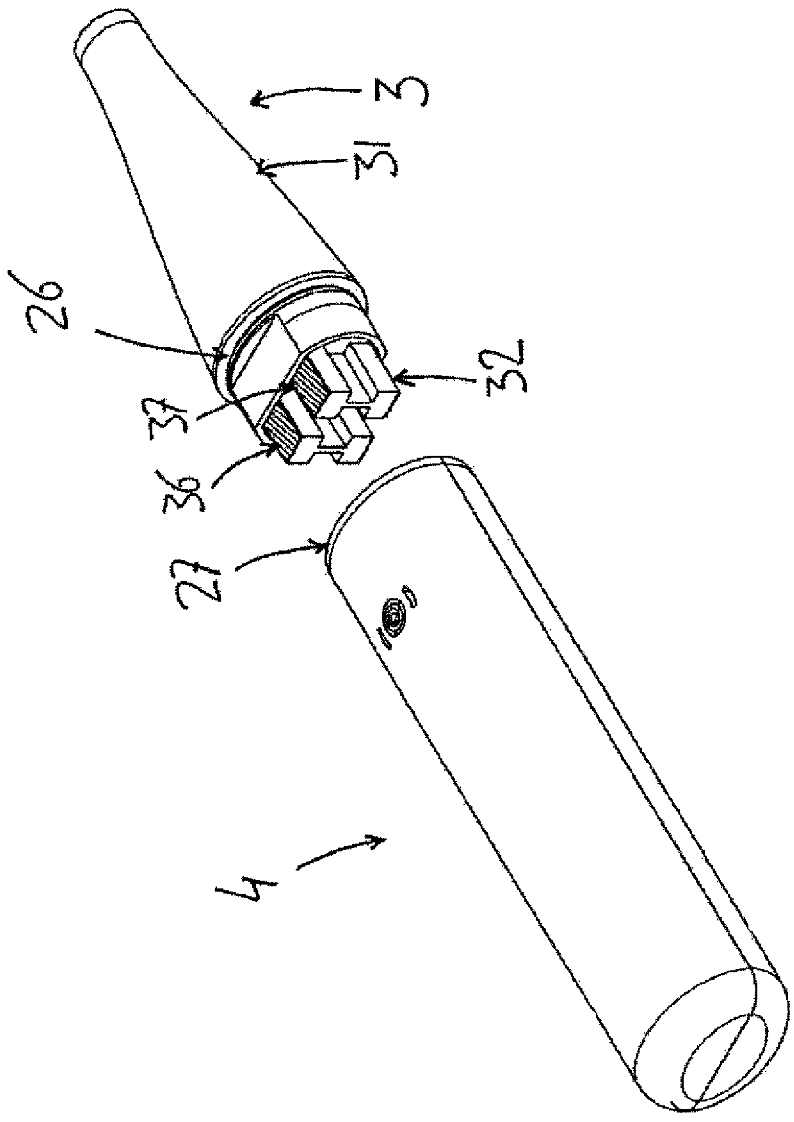

The FIGS. 1-4 show a first embodiment of the e-cigarette 1 according to the invention. FIGS. 1 and 4 show a view in perspective of the e-cigarette 1 and the FIGS. 2 and 3 show a view in cross section.

The e-cigarette 1 comprises a housing 2 having a liquid section 3 for holding a liquid and a battery section 4 for holding a battery 5. The liquid section 3 and the battery section 4 are configured to be coupled to each other via a first section coupling member 26 provided on the liquid section 3 a second section coupling member 27 provided on the battery section 4. The wick 6 for taking up the liquid and the heating member 7 for heating the wick are combined to form a combined construction 12 having an outer surface 13 which is at least partly electrically conductive. This is further discussed in detail with respect to the FIGS. 11 and 12.

The liquid section 3 comprises a liquid reservoir 8 provided with a liquid outlet 9A to supply liquid to the wick 6 and an air duct 10 to create an air flow along the wick 6 and to an air outlet 11. The e-cigarette 1 comprises a first electrical contact member 14 being electrically connected to an anode of the battery 5 and a second electrical contact member 15 being electrically connected to a cathode of the battery 5. The first and second electrical contact members 14, 15 are in contact with conductive parts 18A, 18B of the outer surface 13 of the combined construction 12 without being attached to them.

The e-cigarette 1 comprises an airflow sensor 28 which controls a switch 30 in order to close an electrical circuit 29 which connects the first and second electrical contact members 14, 15 to the anode and cathode of the battery 5 when an airflow is detected and to open the electrical circuit 29 when no airflow is detected. The airflow is indicated by arrows.

Since the wick 6 and the heating member 7 form a combined construction 12, they can be supplied during the production process in a single processing step. In the known e-cigarette, the wick and the heating member are each supplied in a separate processing step. This allows that the e-cigarette 1 according to the invention can be produced in a more efficient manner. It especially allows that the production process can be performed mechanically.

The e-cigarette 1 further allows that the battery 5 is electrically connected to the combined construction 12 of the wick 6 and heating member 7 without being attached to it (via for example welded electrical wires). The process of electrically attaching elements is difficult to perform, especially to perform it mechanically. The fact that in the e-cigarette 1 according to the invention the combined construction 12 is electrically connected to the first and second electrical contact members 14, 15 without being attached to them, allows that the e-cigarette 1 can be produced in a more simple manner. Due to this, the e-cigarette 1 can be produced in a cost efficient manner by machines instead of by the hands of a person.

Figure 5:
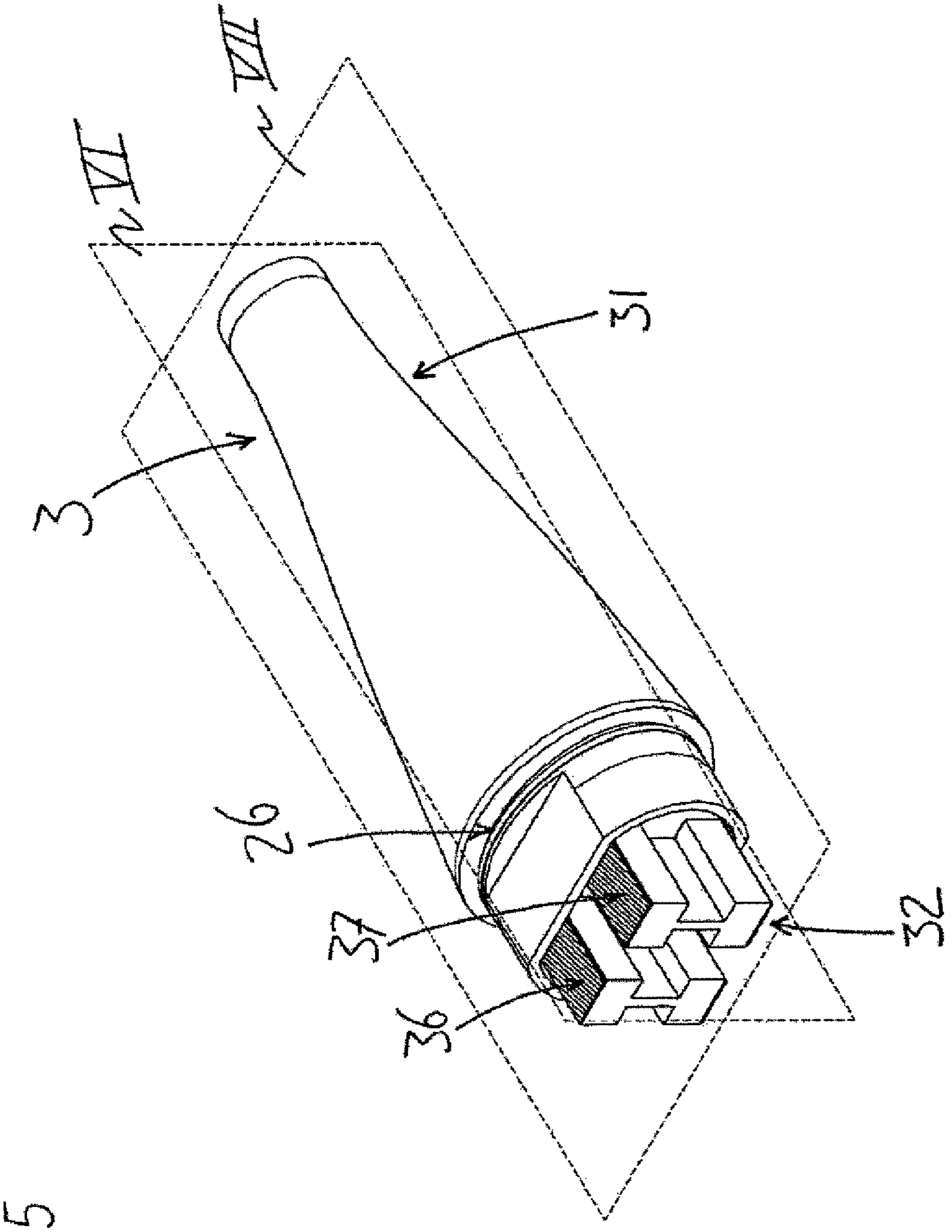
Figure 6:
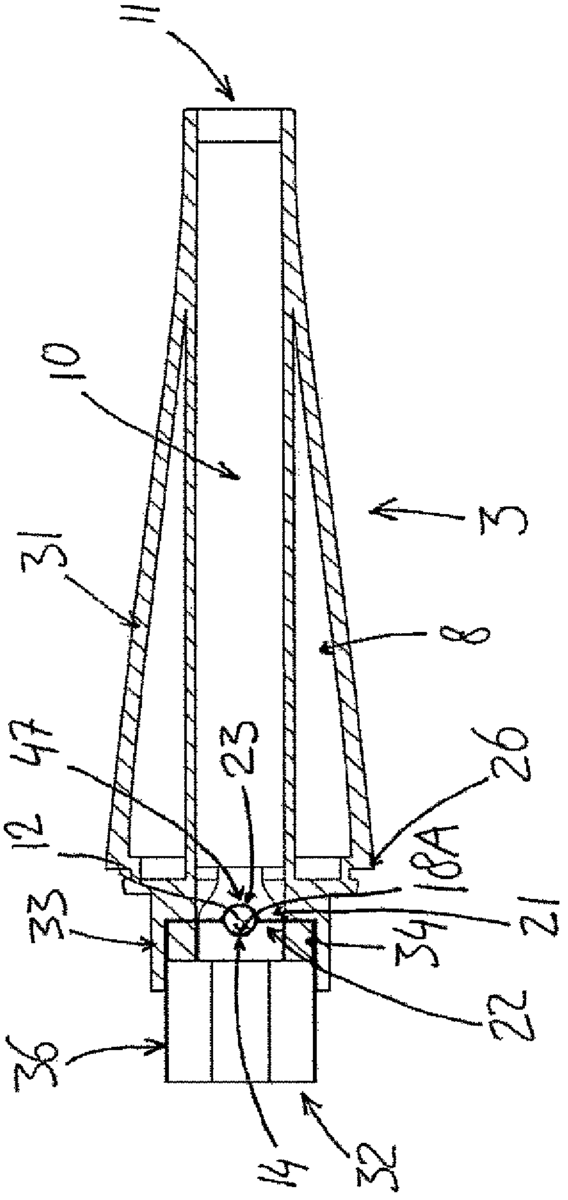
Figure 7:
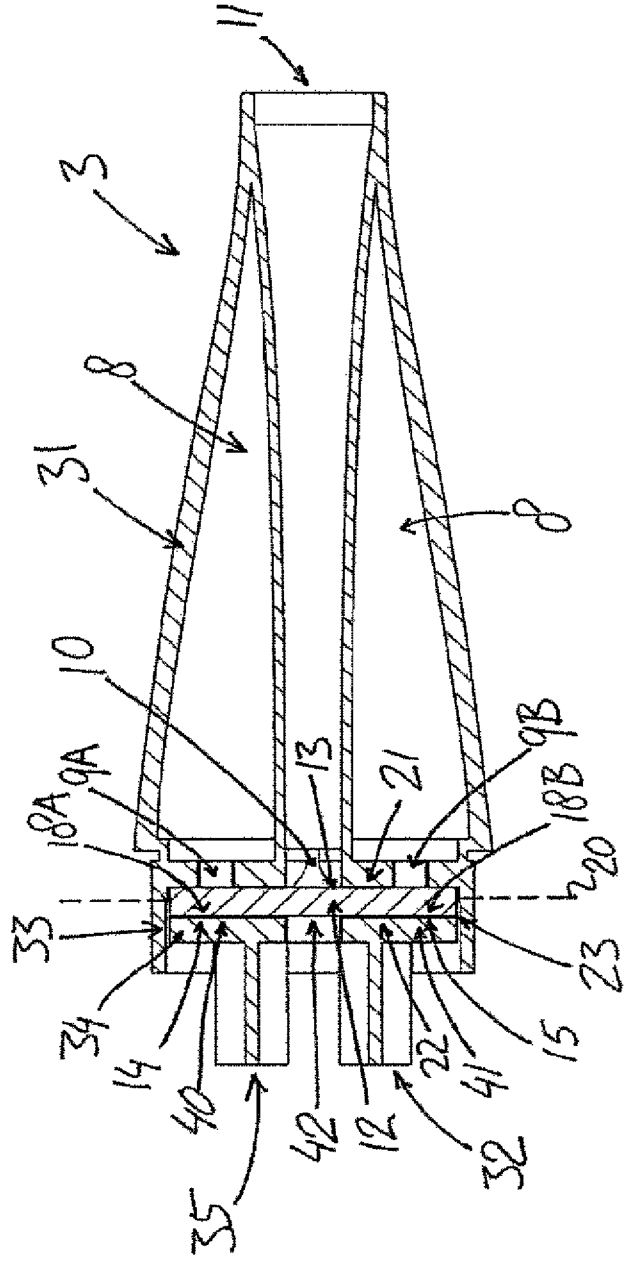

The FIG. 5-7 shows enlarged views of the liquid section 3 of the e-cigarette 1 of FIG. 1.

The entire combined construction 12 extends along a substantially straight line. The combined construction 12 has an elongate form extending along its longitudinal axis 20. The combined construction 12 has such a rigidity that it maintains its form when subjected to gravity. Each of these characteristics allows that the combined construction 12 can be mechanically handled.

In the known e-cigarette, the wick is in general very flexible and does not maintain its form when subjected to gravity or does not maintain its form when handled mechanically, such as during mechanical pick and place operations. It is therefore very difficult to mechanically handle the known wick. The known wick in general also extend in different directions. The known wicks have a first part which extend inside the liquid reservoir and a second part which extends in a different direction along the heading member. Since the known wick extends in different directions, it is difficult to handle it mechanically, such as for mechanical pick and place operations.

The combined construction 12 is located between a first support member 21 and an opposite second support member 22 to hold the combined construction 12 in a fixed position 23. This ensures that there is a continuous contact between the combined construction 12 and the first and second electrical contact members 14, 15.

The first and second electrical contact members 14, 15 are provided on the second support member 22. The first support member 21 comprises a first electrically conductive member 47 located opposite to the first electrical contact member 14 and a second electrically conductive member 48 located opposite to the second electrical contact member 15. The first and second electrically conductive members 47, 48 enhance the performance of the e-cigarette 1.

The combined construction 12 is in contact with the first and second support member 21, 22 without being attached to them. The combined construction 12 is free from any attached contact with the e-cigarette 1. This allows that the e-cigarette 1 can be produced mechanically in an efficient manner.

Figure 10:
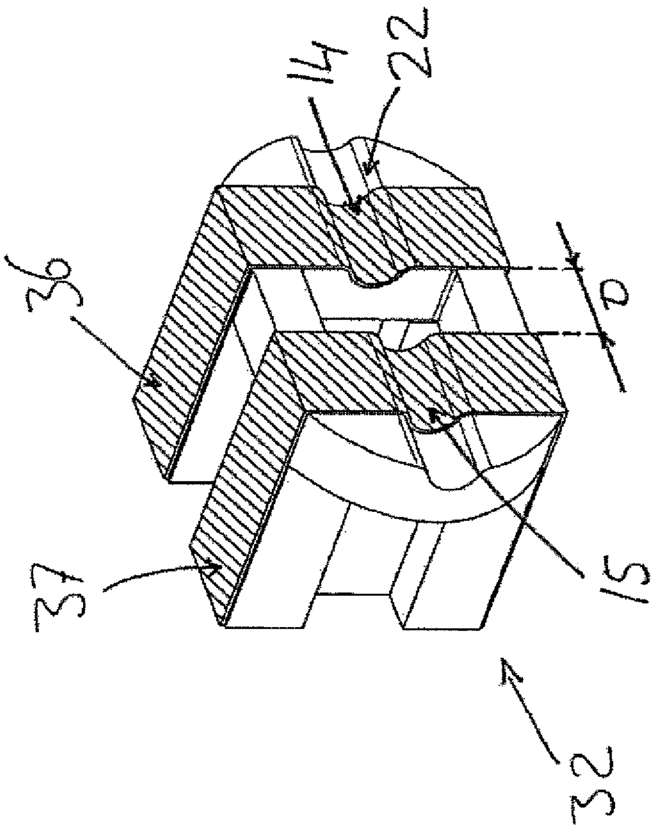

The first and second electrical contact members 14, 15 are located at a distance D from each other along the longitudinal axis 20 of the combined construction 12 (see also FIG. 10). This ensures that an electrical current can flow through the combined construction 12.

The combined construction 12 of the e-cigarette 1 is located in the liquid section 3. The liquid section 3 comprises a first liquid part 31 and a second liquid part 32. The first liquid part 31 is provided with the liquid reservoir 8 and the air outlet 11. The liquid outlet 9A is located adjacent to the combined construction 12. The air duct 10 extends from the combined construction 12 to the air outlet 11.

The first liquid part 31 comprises a first coupling member 33 and the second liquid part 32 comprises a second coupling member 34 which is configured to cooperate with the first coupling member 33 to couple the second liquid part 32 to the first liquid part 31 such that the second liquid 32 part is located in a coupled position 35. The first and second contact members 14, 15 are provided on the second liquid part 32.

The second liquid part 32 comprises a third electrical contact member 36 being electrically connected to the first electrical contact member 14 and a fourth electrical contact member 37 being electrically connected to the second electrical contact member 15, which third and fourth electrical contact member 36, 37 are configured to become electrically connected with the battery 5 when the battery section 4 is coupled to the liquid section 3.

Figure 4B:
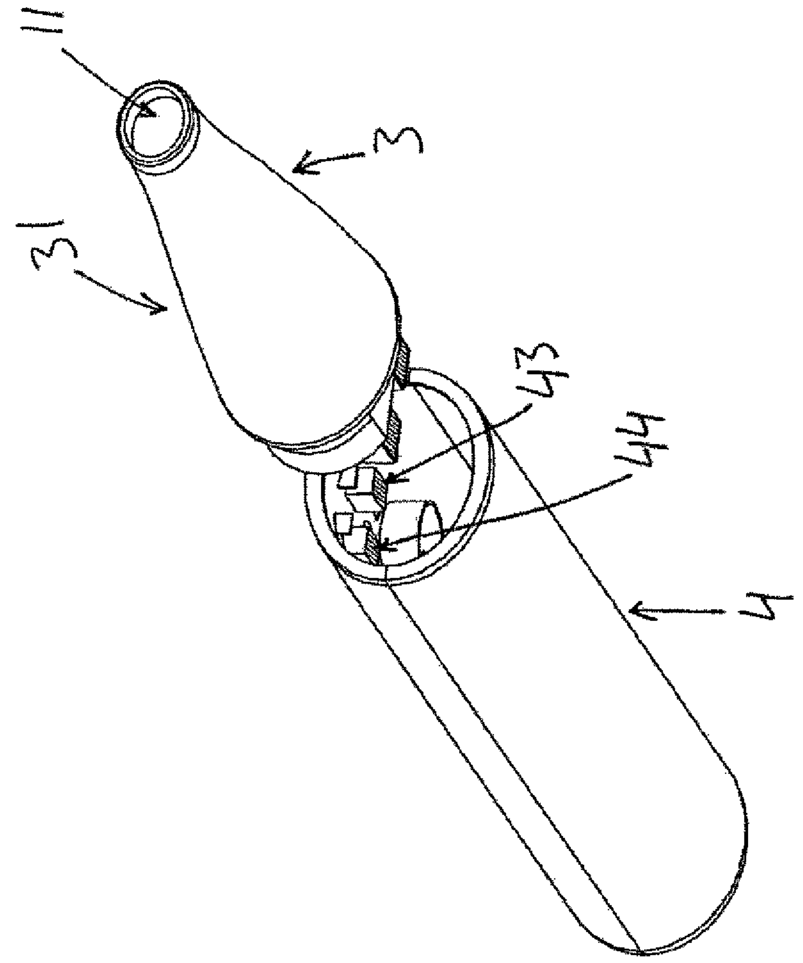

As shown in the FIGS. 2 and 4B, the battery section 4 comprises a fifth electrical contact member 43 and a sixth electrical contact member 44 which are in contact with the anode and the cathode of the battery 5, respectively. The liquid section 3 and the battery section 4 are configured to place the third electrical contact member 36 and the fourth electrical contact member 37 in contact with the fifth electrical contact member 43 and the sixth electrical contact member 44, respectively, when the liquid section 3 is coupled to the battery section 4.

The first liquid part 31 is provided with the first support member 21 and the second liquid part 32 is provided with the second support member 22.

The liquid reservoir 8 is provided with a further liquid outlet 9B located adjacent to the combined construction 12. The combined construction 12 comprises a first construction end 40, a second construction end 41 and an intermediate construction part 42 which is located between the first construction end 40 and the second construction end 41. The first construction end 40 is located at the liquid outlet 9A, the second construction end 41 is located at the further liquid outlet 9B and the air duct 10 is located at the intermediate construction part 42.

The first liquid part 31 is formed as a first single piece, more specifically by injection moulding. This allows that the first liquid part 31 is produced in a cost efficient manner.

The second liquid part 32 is formed as a second single piece. The second liquid part 32 can be formed by injection moulding on electrically conductive material or by injection moulding in a first production step and electrically conductive material is deposed in a second production step. This allows that the second liquid part 32 is produced in a cost efficient manner.

Figure 8:
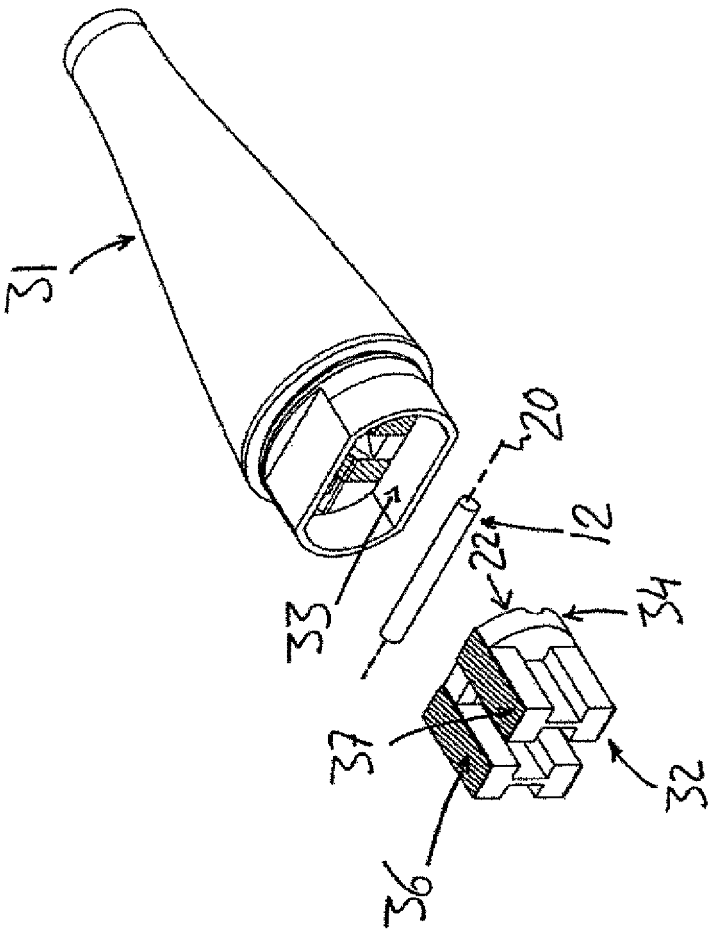
Figure 9:
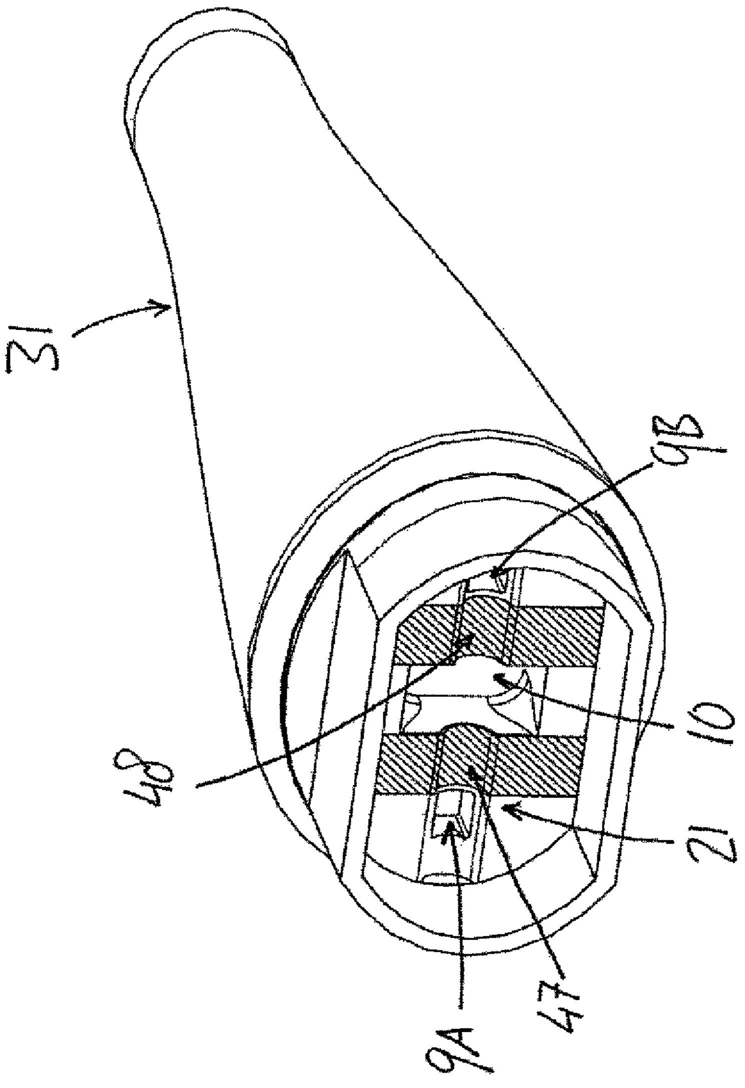

FIG. 8 shows an exploded view of the liquid section 3 of FIG. 5. Different views of the first liquid part 31 and the second liquid part 32 are shown in the FIGS. 9 and 10, respectively.

Figure 11:
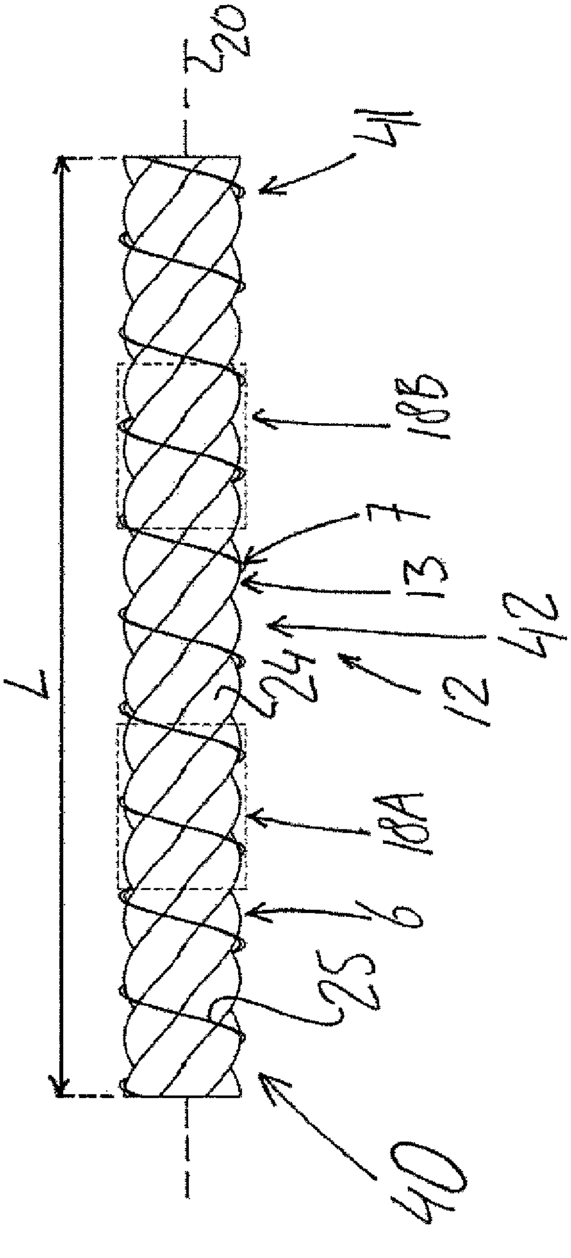

FIG. 11 shows a top view of a first embodiment of the combined construction 12 of the liquid section of FIG. 5. The wick 6 of the combined construction 12 is formed by a fibrous material 24. The fibrous material 24 is a fibre rope. The heating member 7 of the combined construction 12 is formed by an electrically conductive wire 25. The electrically conductive wire 25 extends along the entire length L of the wick. The electrically conductive wire 25 is wound in a helical form around the wick 6.

Figure 12:
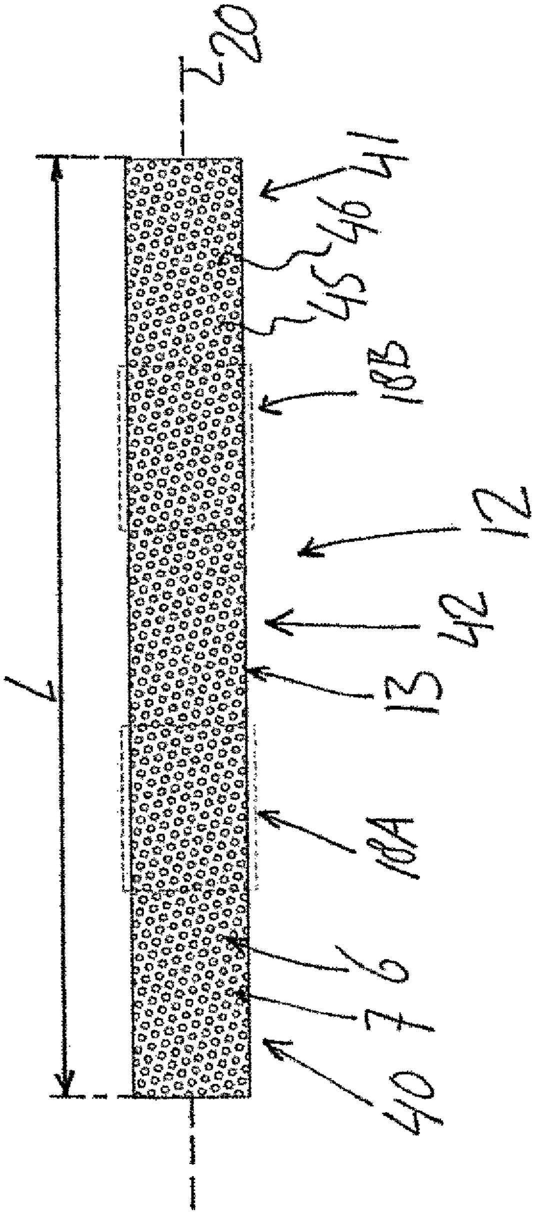
Figure 13:
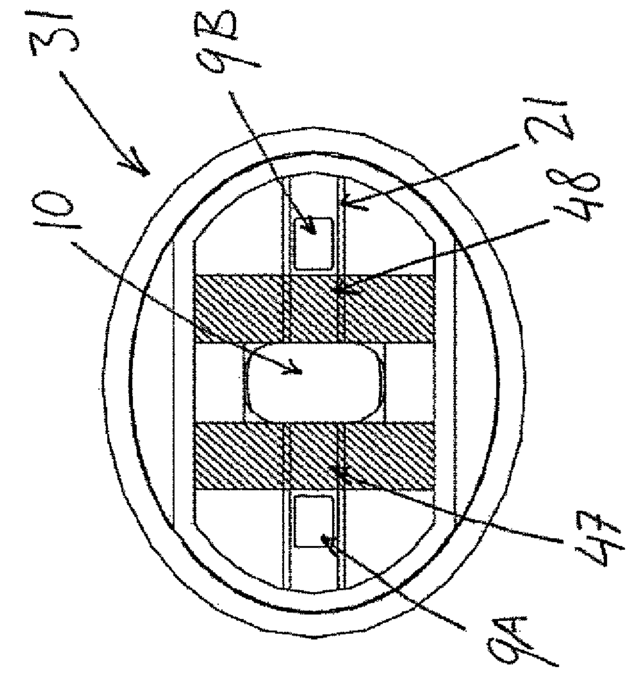
Figure 14:
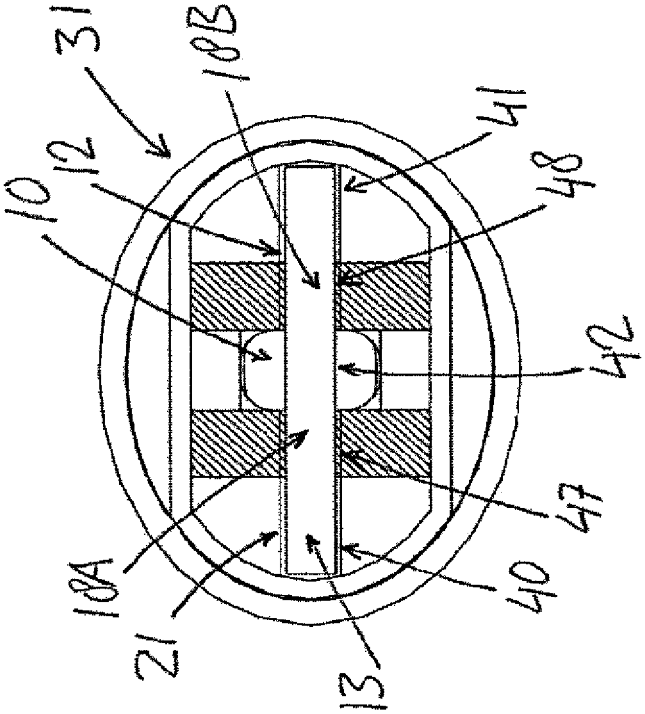
Figure 15:
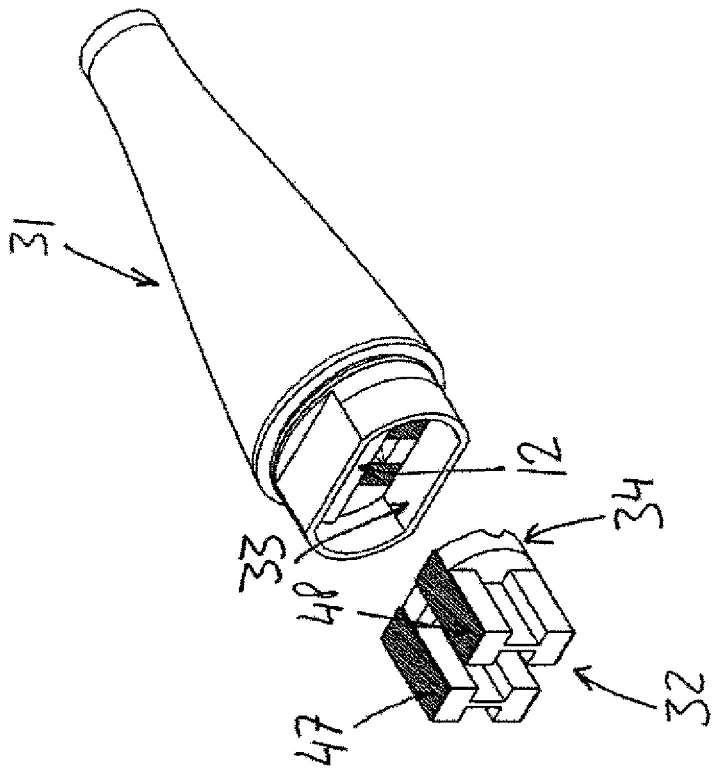
Figure 16:
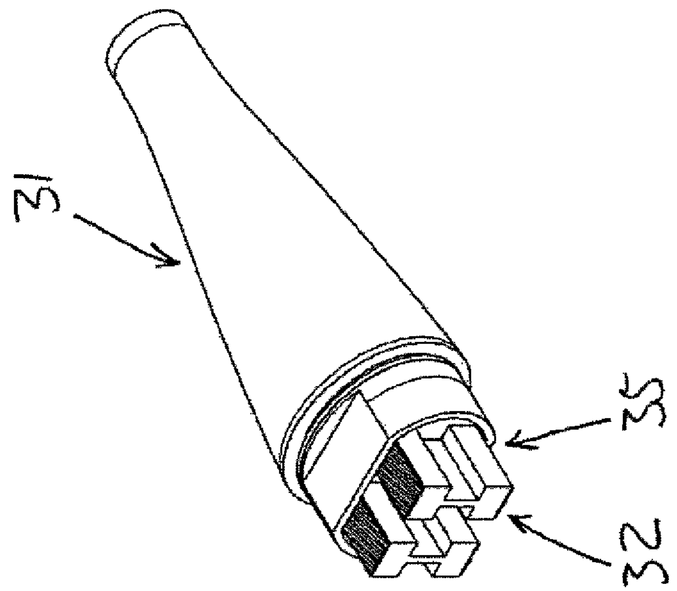
Figure 17:
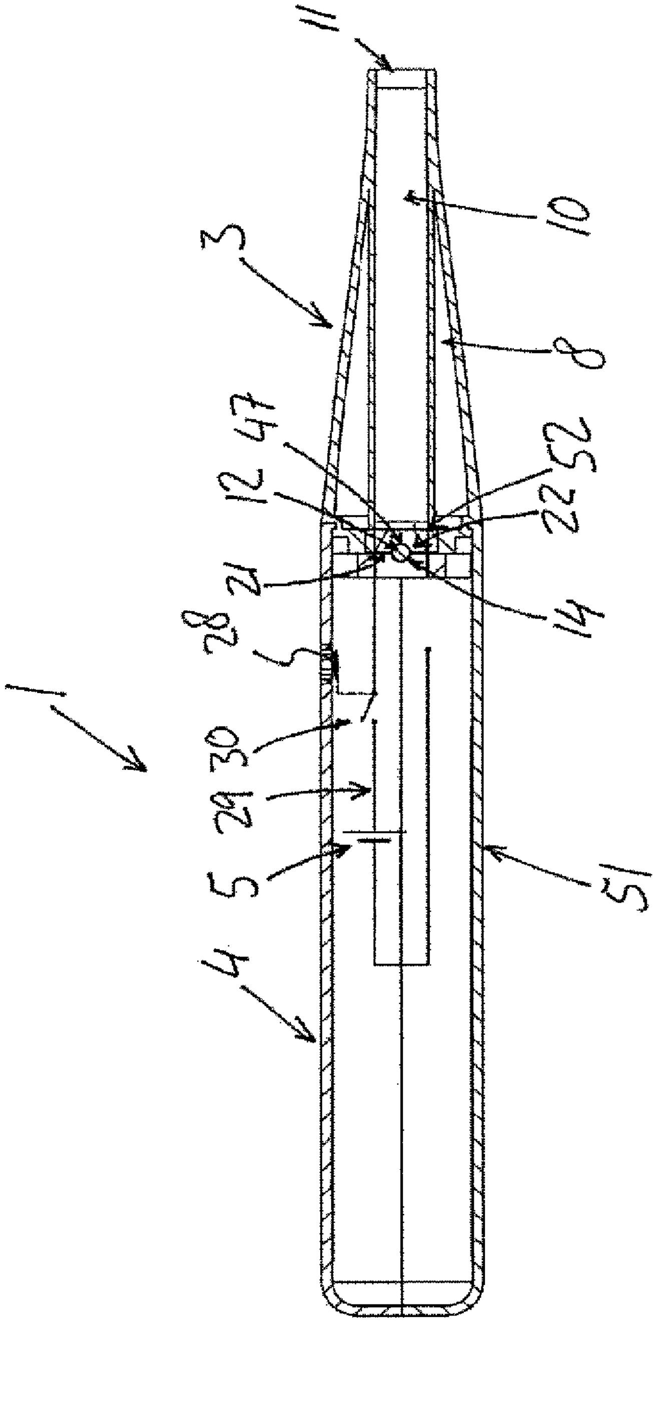
Figure 18:
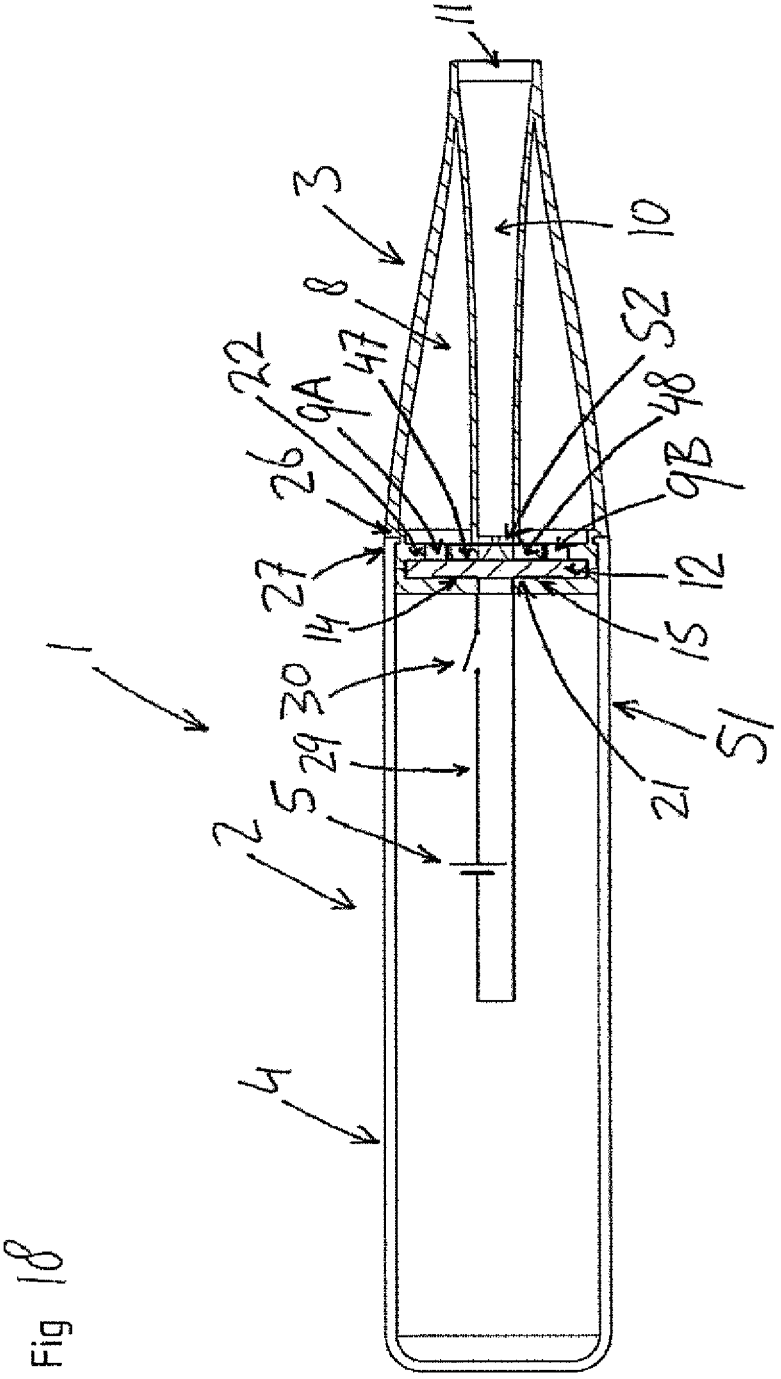
Figure 19:
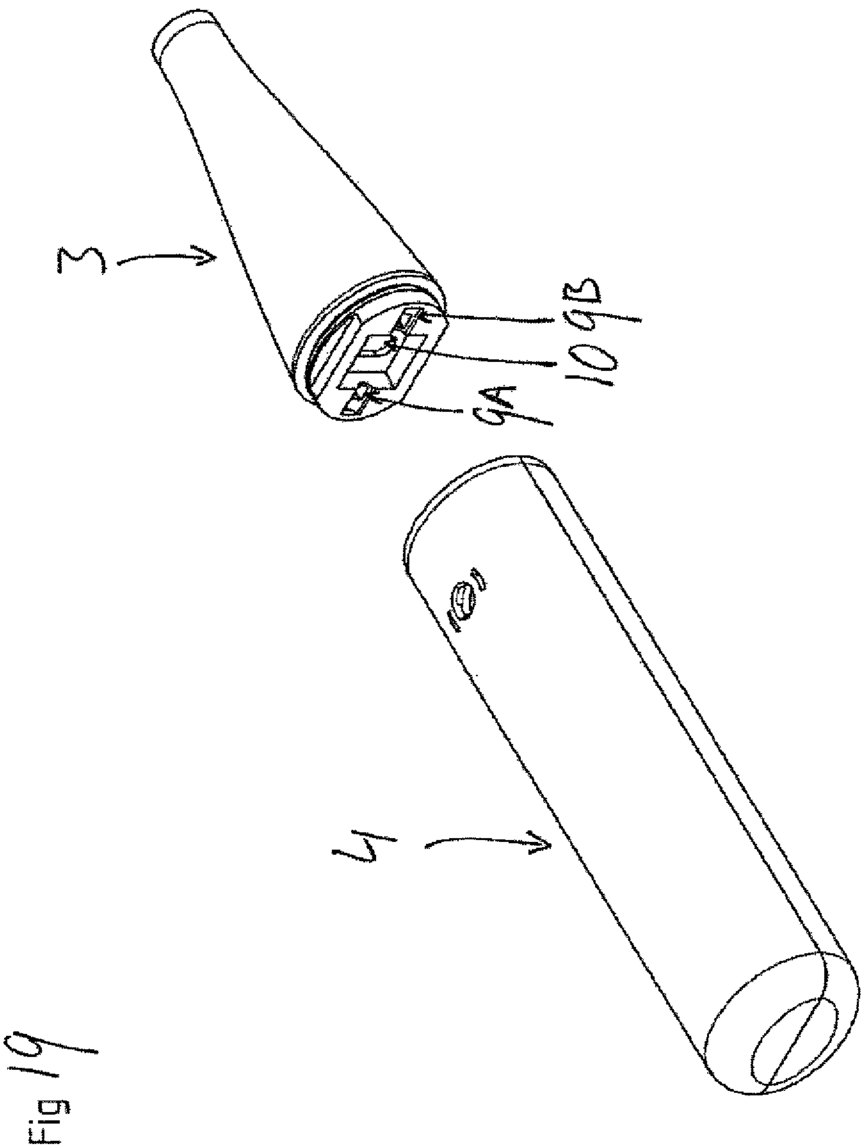
Figure 20:
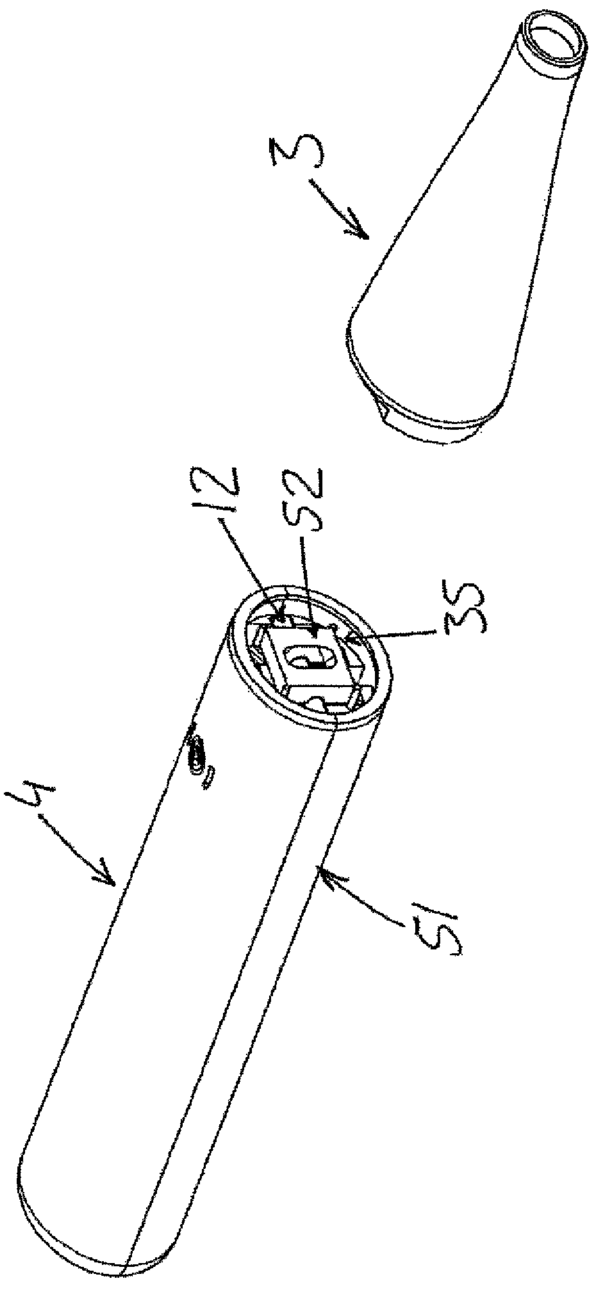
Figure 21:
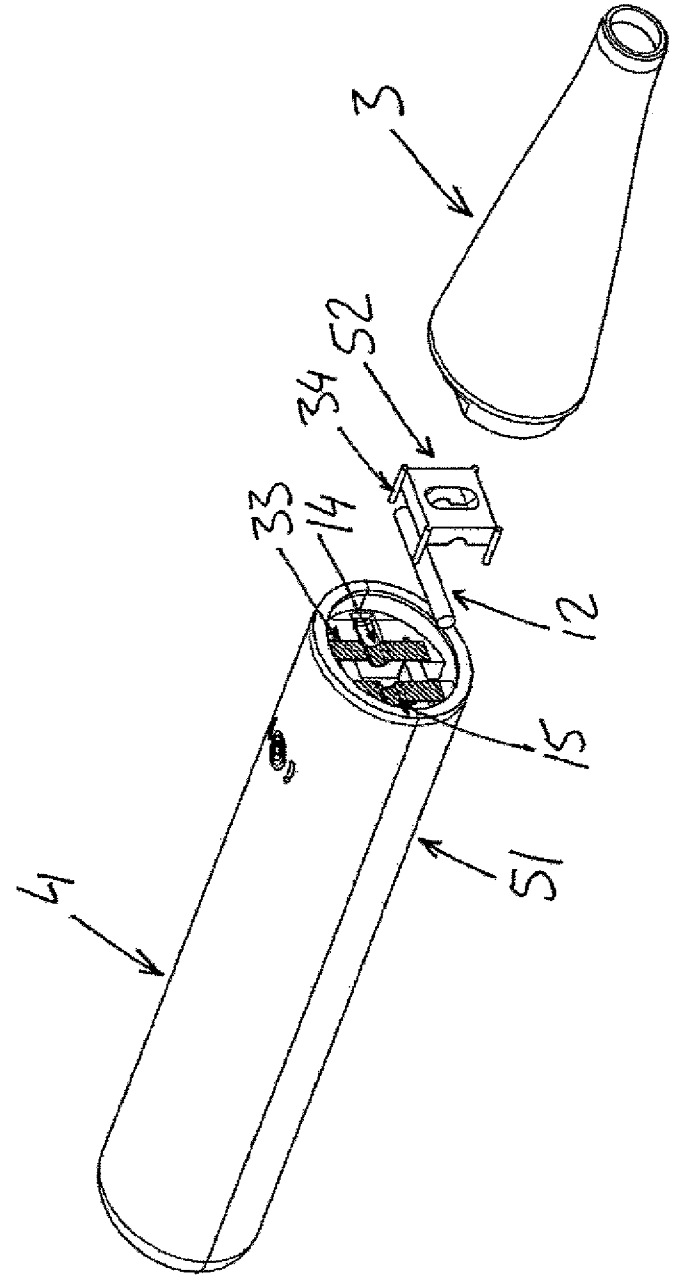

FIG. 12 shows a top view of a second embodiment of the combined construction 12 of the liquid section of FIG. 5. The wick 6 of the combined construction 12 is formed by a ceramic material 45. The ceramic material 45 has a porous structure. The heating member 7 is formed by an electrically conductive additive 46 provided in the ceramic material 45. The electrically conductive additive 46 provides the electrical conductivity through the combined construction 12 and along its outer surface 13.

The FIG. 13-16 schematically shows a first embodiment of the method of producing the e-cigarette 1. The method comprises the steps of providing the combined construction 12 and positioning it on the liquid section 3 (see the FIGS. 13 and 14). After that, the first and second contact members 14, 15 are placed in contact with the outer surface 13 of the combined construction 12 without attaching the first and second contact members 14, 15 to the combined construction 12 (see the FIGS. 15 and 16). This allows that the method is performed mechanically in an efficient manner.

In the shown method, the combined construction 12 is placed on the first support member 21, and the second support member 22 is placed in contact with the combined construction 12 such that the combined construction 12 is held in a fixed position 23.

The combined construction 12 is placed in the first liquid part 31 such that the combined construction 12 extends along the liquid outlet 9A, 9B and the air duct 10, and the second liquid part 32 is subsequently coupled to the first liquid 31 part such that the second liquid part 32 is located in the coupled position 35 while the first and second electrical contact members 14, 15 contact electrically conductive parts 18A, 18B at the outer surface 13 of the combined construction 12.

The method further comprises coupling the liquid section 3 and the battery section 4 to each other (see FIG. 1). The method comprises the steps of coupling the liquid section 3 to the battery section 4 such that the third electrical contact member 36 and the fourth electrical contact member 37 of the liquid section 3 are in contact with the fifth electrical contact member 43 and the sixth electrical contact member 44 of the battery section 4 (see FIG. 2).

The FIGS. 17-21 show a second embodiment of the e-cigarette 1 according to the invention. The outside of the housing 2 of the second embodiment looks similar to the first embodiment as shown in FIG. 1. The combined construction 12 is located in the battery section 4. The battery section 4 comprises a first battery part 51 and a second battery part 52. The first battery part 51 is provided with the battery 5. The first battery part 51 comprises a first coupling member 33 and the second battery part 52 comprises a second coupling member 34 which is configured to cooperate with the first coupling member 33 to couple the second battery part 52 to the first battery part 51 such that the second battery part 52 is located in a coupled position 35. The first and second contact members 14, 15 are provided on the first battery part 51. The first battery part 51 is provided with the first support member 21 and the second battery part 52 is provided with the second support member 22.

The method of producing the second embodiment of the e-cigarette 1 comprises the steps of providing the combined construction and positioning it on the battery section 4, and placing first and second contact members 14, 15 in contact with the outer surface 13 of the combined construction 12 without attaching the first and second contact members 14, 15 to the combined construction 12.

The method further comprises the steps of placing the combined construction 12 in the first battery part 51, and subsequently coupling the second battery part 52 to the first battery part 51 such that the second battery part 52 is located in the coupled position 35 while the first and second electrical contact members 14, 15 contact electrically conductive parts 18A, 18B at the outer surface 13 of the combined construction 12.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms “a” or “an”, as used herein, are defined as one or more than one. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the devices and methods shown in the figures without departing from the scope as defined in the claims.

The invention claimed is:

1. A method of producing a component of an e-cigarette comprising:

providing a combined construction comprising a wick and a heater;

positioning the combined construction adjacent a first support member of a housing, wherein the housing comprises a liquid reservoir provided with a liquid outlet configured to supply liquid held inside the liquid reservoir to the wick and an air duct to create an air flow along the wick and to an air outlet; and placing a second support member such that the combined construction is held in a fixed position between the first and second support members.

2. The method according to claim 1, wherein the step of providing the combined construction is performed in a single processing step.

3. The method according to claim 1, wherein the method is performed by a machine.

4. The method according to claim 1, further comprising placing first and second electrical contact members in contact with the combined construction without welding the first and second contact members to the combined construction.

5. The method according to claim 4, wherein the step of positioning includes:

placing the combined construction in a first liquid part of the housing such that the combined construction extends along the liquid outlet and the air duct, and subsequently coupling a second liquid part of the housing to the first liquid part such that the second liquid part is located in a coupled position while the first and second electrical contact members contact electrically conductive parts at the outer surface of the combined construction.

6. The method according to claim 5, wherein the first liquid part is provided with the liquid reservoir and the air outlet, the liquid outlet is located adjacent to the combined construction, the air duct extends from the combined construction to the air outlet.

7. The method according to claim 5, wherein the first liquid part comprises a first coupling member and the second liquid part comprises a second coupling member which is configured to cooperate with the first coupling member to couple the second liquid part to the first liquid part such that the second liquid part is located in the coupled position.

8. The method according to claim 5, wherein the first liquid part is provided with the first support member and the second liquid part is provided with the second support member.

9. The method according to claim 5, wherein the liquid reservoir is provided with a further liquid outlet located adjacent to the combined construction.

10. The method according to claim 9, wherein the combined construction comprises a first construction end, a second construction end, and an intermediate construction part which is located between the first construction end and the second construction end, and the first construction end is located at the liquid outlet, the second construction end is located at the further liquid outlet and the air duct is located at the intermediate construction part.

11. The method according to claim 1, wherein the combined construction extends along a longitudinal axis and has a rectangular cross section perpendicular to the longitudinal axis.

12. The method according to claim 1, wherein the combined construction has such a rigidity that the combined construction maintains its form when handled mechanically.

13. The method according to claim 1, wherein the combined construction has such a rigidity that the combined construction maintains its form when subjected to gravity.

14. The method according to claim 1, wherein the combined construction is not welded to the first and second support members.

15. The method according to claim 1, wherein the wick comprises a ceramic material.

16. The method according to claim 15, wherein the ceramic material is porous.

17. The method according to claim 15, wherein the heater comprises an electrically conductive material.

18. The method according to claim 1, wherein the component further comprises an air inlet opposite the air outlet such that air flows through the housing from the air inlet, along the combined construction, through the air duct and to the air outlet.

19. The method according to claim 1, further comprising providing a liquid in the liquid reservoir.

* * * * *